(12) United States Patent
Lane

(10) Patent No.: US 12,503,053 B1
(45) Date of Patent: Dec. 23, 2025

(54) MODULAR STEPPING DEVICE

(71) Applicant: Omega Boat Step, LLC, Athens, TN (US)

(72) Inventor: Jacob Lane, Athens, TN (US)

(73) Assignee: Omega Boat Step, LLC, Athens, TN (US)

( * ) Notice: Subject to any disclaimer, the term of this patent is extended or adjusted under 35 U.S.C. 154(b) by 0 days.

(21) Appl. No.: 19/088,489

(22) Filed: Mar. 24, 2025

(51) Int. Cl.
*B60R 3/00* (2006.01)
*B60R 3/02* (2006.01)

(52) U.S. Cl.
CPC .................... *B60R 3/007* (2013.01)

(58) Field of Classification Search
CPC ................ B60R 3/02; B60R 3/007
See application file for complete search history.

(56) References Cited

U.S. PATENT DOCUMENTS

| | | | |
|---|---|---|---|
| 4,943,076 A | 7/1990 | Tripke | |
| 4,974,865 A | 12/1990 | Capps | |
| 5,896,946 A | 4/1999 | Brackett | |
| 6,554,311 B1 | 4/2003 | Blankenship et al. | |
| 7,410,031 B2 | 8/2008 | Jensen | |
| 7,635,247 B2 | 12/2009 | Collins | |
| 7,766,357 B2 | 8/2010 | Arvanites | |
| 8,322,739 B1 | 12/2012 | Fair et al. | |
| 9,487,146 B1 | 11/2016 | Lowell et al. | |
| 9,487,147 B1 | 11/2016 | Morrill | |
| 9,676,318 B2 * | 6/2017 | Langenfeld | B60P 3/1075 |
| 9,914,397 B2 * | 3/2018 | Hoffman | B60R 3/007 |
| 11,370,361 B1 | 6/2022 | Gonzales | |
| 11,970,136 B2 | 4/2024 | Wymore | |
| 12,103,343 B1 * | 10/2024 | Rebick | B60R 3/007 |
| 2010/0025955 A1 | 2/2010 | Carr | |
| 2013/0015637 A1 | 1/2013 | Siebrandt | |

\* cited by examiner

*Primary Examiner* — Bryan A Evans
(74) *Attorney, Agent, or Firm* — Robinson IP Law, PLLC

(57) ABSTRACT

Various implementations include a device for providing access to a vehicle. The device includes a main tube, a base mounting plate, and steps. The main tube has first and second ends. A surface of the main tube defines a plurality of main tube fastener openings spaced apart from each other lengthwise. The base mounting plate is coupled to the first end and defines base mounting plate apertures. The device includes first and second steps each including a step platform and a step support gusset coupled thereto. Each step support gusset defines gusset fastener openings. The gusset fastener openings of each step are each alignable with a different one of the main tube fastener openings such that a fastener can extend through the gusset fastener openings and the respective aligned main tube fastener opening to couple the first step and the second step to the main tube.

20 Claims, 7 Drawing Sheets

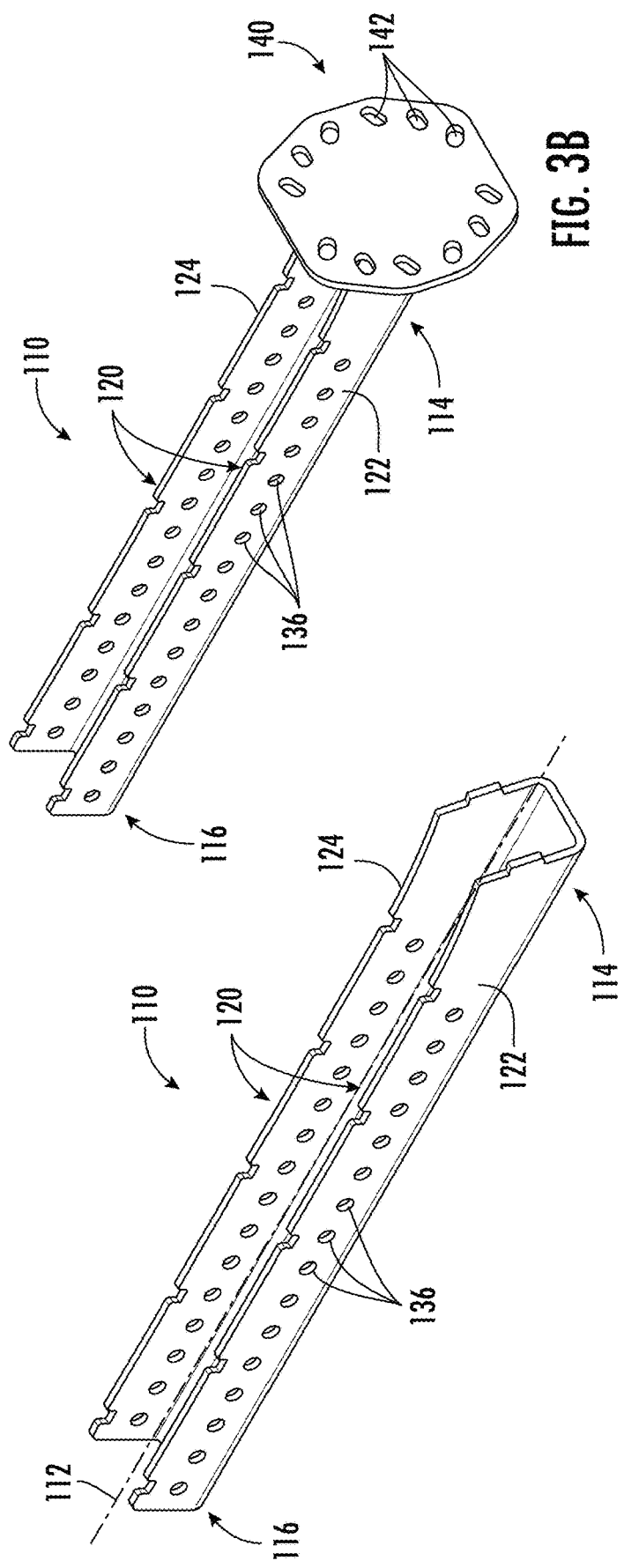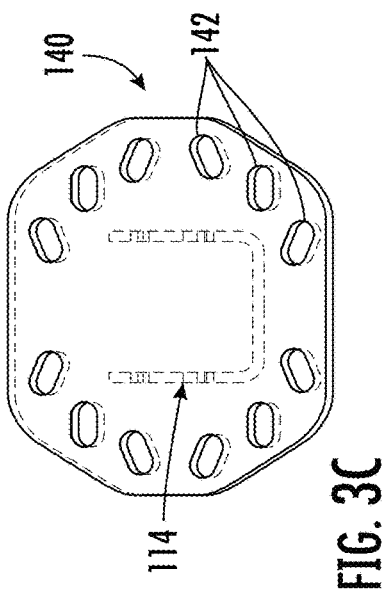
FIG. 3A
FIG. 3B
FIG. 3C

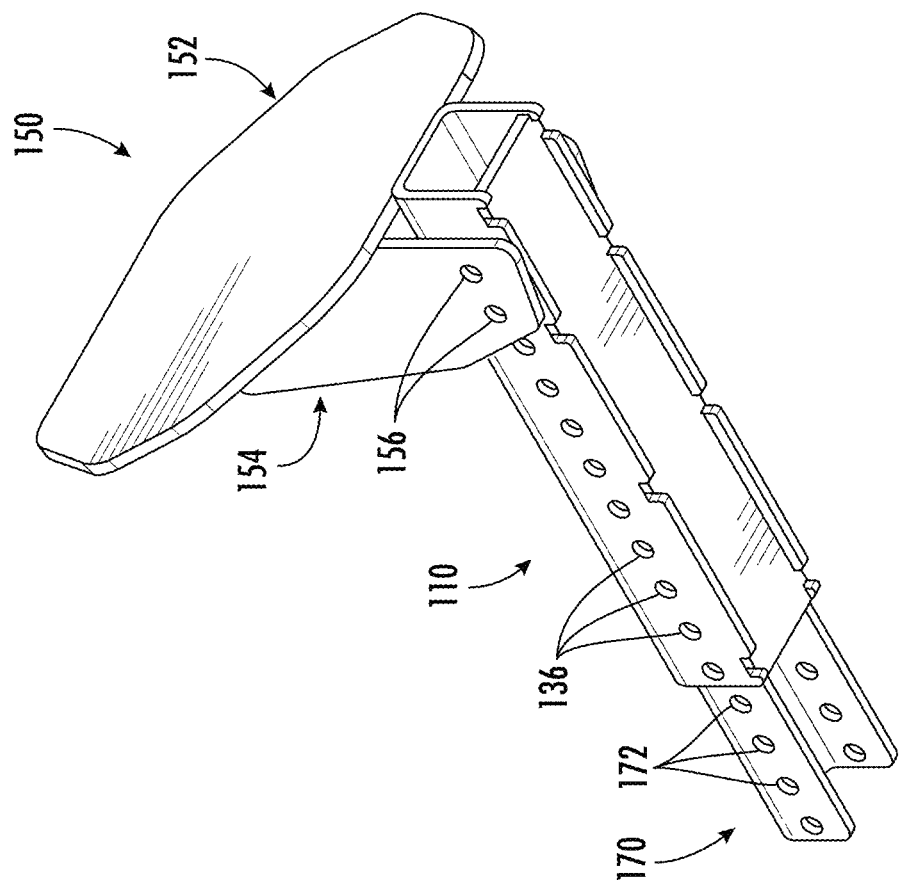
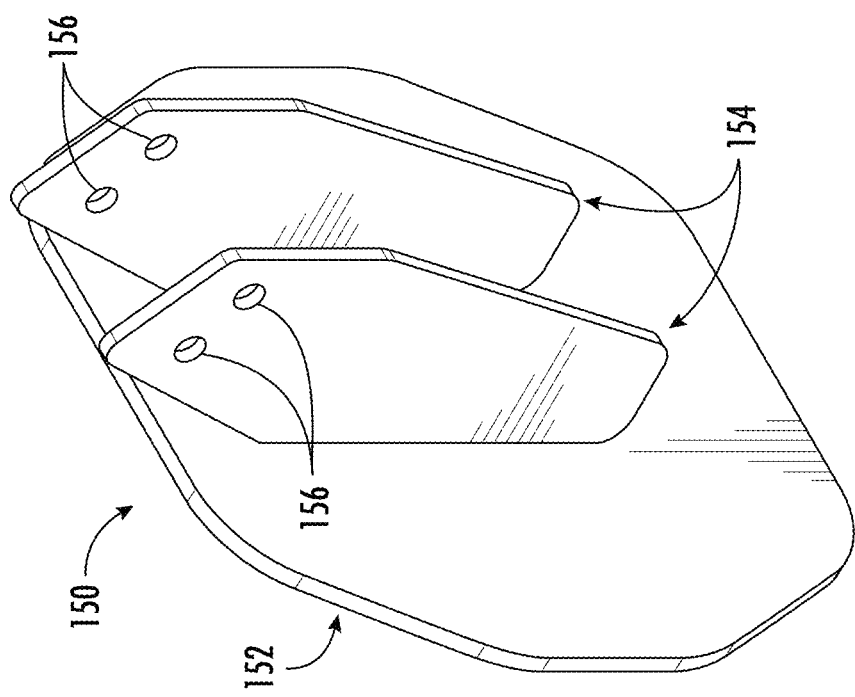
FIG. 5B
FIG. 5A

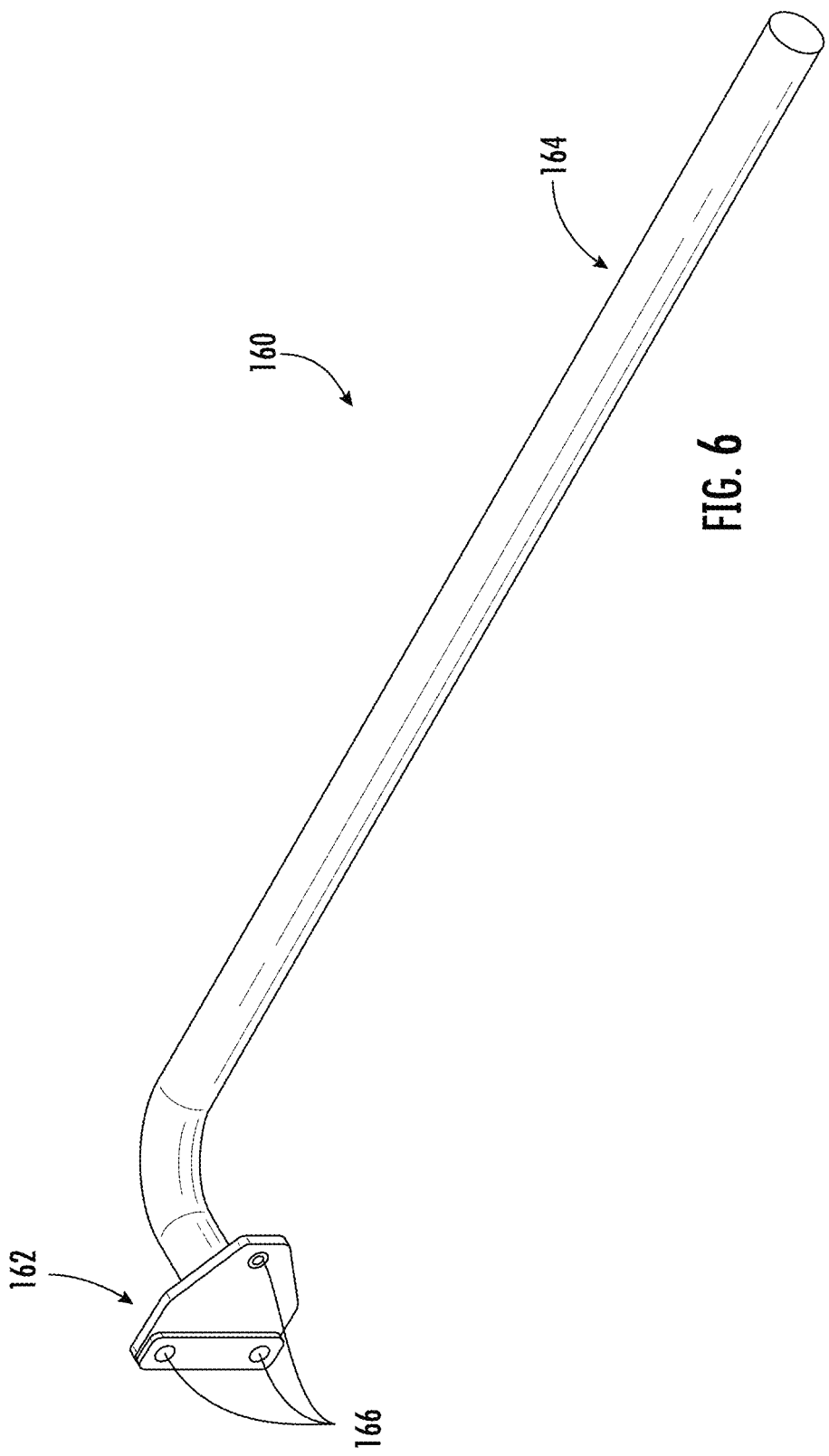

MODULAR STEPPING DEVICE

BACKGROUND

Trailers are commonly used to transport boats and other vehicles. These trailers typically include a frame with wheels and a tongue for connecting to a tow vehicle. Some trailers also incorporate steps or ladders to provide access to the boat or other vehicle when it is loaded on the trailer.

Traditional trailer steps often have fixed configurations with limited adjustability. This can present challenges when trying to accommodate boats or other vehicles of different sizes and heights. Additionally, fixed steps may not provide optimal positioning for safely and comfortably boarding or exiting the boat or other vehicle in various situations.

Some existing trailer step designs allow for limited adjustability, such as folding mechanisms or telescoping components. However, these designs may still lack the versatility needed to adapt to a wide range of boat/vehicle and trailer combinations.

Thus, a need exists for a modular and highly adjustable stepping device for trailers that can be easily customized to accommodate a wide range of boat or other vehicle sizes, trailer configurations, and usage scenarios while providing secure and comfortable access in various conditions.

SUMMARY

Various implementations provide a device for providing access to a vehicle. The device includes a main tube, a base mounting plate, and at least a first step and a second step. The main tube has a longitudinal axis, a first end, and a second end spaced opposite and spaced apart along the longitudinal axis from the first end. A surface of the main tube between the first end and the second end defines a plurality of main tube fastener openings spaced apart from each other in a direction parallel to the longitudinal axis. The base mounting plate is coupled to the first end. The base mounting plate defines one or more base mounting plate apertures extending therethrough. The first step and the second step each comprise a step platform and a step support gusset coupled to the step platform. The step support gusset of each of the first step and the second step defines one or more gusset fastener openings. The one or more gusset fastener openings of the first step and the second step are each alignable with a different one of the plurality of main tube fastener openings such that a fastener can extend through the one or more gusset fastener openings and the respective aligned main tube fastener opening to couple the first step and the second step to the main tube.

In some implementations, the one or more gusset fastener openings of the first step and the second step include two or more gusset fastener openings.

In some implementations, the device further comprises a grip handle that is couplable to the main tube. In some implementations, the grip handle further comprises a grip handle mounting plate and a handle member. In some implementations, the grip handle mounting plate defines one or more grip handle mounting plate apertures for coupling the grip handle to the main tube. In some implementations, the handle member is coupled to the grip handle mounting plate.

In some implementations, the spacing between each adjacent of the plurality of main tube fastener openings ranges from 0.5 inches to 1.5 inches. In some implementations, the main tube has a length as measured from the first end to the second end, wherein the length ranges from 15 inches to 25 inches.

In some implementations, the surface of the main tube is a first surface, wherein the main tube further includes a second surface between the first end and the second end. In some implementations, the first surface is spaced apart from the second surface. In some implementations, the plurality of main tube fastener openings is a plurality of first main tube fastener openings. In some implementations, the second surface defines a plurality of second main tube fastener openings spaced apart from each other in a direction parallel to the longitudinal axis. In some implementations, the step support gusset of the first step and the second step is a first step support gusset and the one or more gusset fastener openings of the first step and the second step are one or more first gusset fastener openings. In some implementations, each of the first step and the second step further include a second step support gusset coupled to the step platform. In some implementations, the second step support gusset of each of the first step and the second step defines one or more second gusset fastener openings. In some implementations, the one or more second gusset fastener openings of the first step and the second step are each alignable with a different one of the plurality of second main tube fastener openings such that a fastener can extend through the one or more second gusset fastener openings and the respective aligned second main tube fastener opening to couple the first step and the second step to the main tube.

In some implementations, the one or more base mounting plate apertures include four or more base mounting plate apertures. In some implementations, the one or more base mounting plate apertures include slotted openings. In some implementations, the slotted openings of the one or more base mounting plate apertures extend in a direction forming an oblique angle with a plane defining the surface of the main tube. In some implementations, the one or more base mounting plate apertures include two or more base mounting plate apertures. In some implementations, the two or more base apertures have a minimum spacing distance as measured between closest edges of the two or more base mounting plate apertures. In some implementations, the minimum spacing distance is in the range from 3 inches to 3.5 inches.

In some implementations, the device further includes a nether step that is couplable to the base mounting plate. In some implementations, the nether step further includes a nether step platform and a nether step mounting plate coupled to the nether step platform. In some implementations, the nether step mounting plate includes one or more nether step apertures for coupling the nether step to the base mounting plate.

In some implementations, the device further includes a third step including a step platform and a step support gusset coupled to the step platform of the third step. In some implementations, the step support gusset of the third step defines one or more third gusset fastener openings. In some implementations, the one or more third gusset fastener openings are each alignable with a different one of the plurality of main tube fastener openings such that a fastener can extend through the one or more third gusset fastener openings and the respective aligned main tube fastener opening to couple the third step to the main tube.

In some implementations, the device further includes a fourth step including a step platform and a step support gusset coupled to the step platform of the fourth step. In some implementations, the step support gusset of the fourth step defines one or more fourth gusset fastener openings. In some implementations, the one or more fourth gusset fastener openings are each alignable with a different one of the plurality of main tube fastener openings such that a fastener can extend through the one or more fourth gusset fastener openings and the respective aligned main tube fastener opening to couple the fourth step to the main tube.

In some implementations, the main tube is a first main tube. In some implementations, the device further includes a second main tube and a tube coupler. In some implementations, the second main tube has a longitudinal axis, a first end, and a second end spaced opposite and spaced apart along the longitudinal axis of the second main tube from the first end of the second main tube. In some implementations, a surface of the second main tube between the first end of the second main tube and the second end of the second main tube defines a plurality of main tube fastener openings spaced apart from each other in a direction parallel to the longitudinal axis of the second main tube. In some implementations, the tube coupler is engageable with the surface of the first main tube and the surface of the second main tube to couple the first main tube to the second main tube. In some implementations, the tube coupler is engageable with at least one of the main tube fastener openings of each of the first main tube and the second main tube.

In some implementations, the surface of the first main tube is a first surface. In some implementations, the first main tube further includes a second surface between the first end of the first main tube and the second end of the first main tube. In some implementations, the first surface of the first main tube is spaced apart from the second surface of the first main tube. In some implementations, the surface of the second main tube is a first surface. In some implementations, the second main tube further includes a second surface between the first end of the second main tube and the second end of the second main tube. In some implementations, the first surface of the second main tube is spaced apart from the second surface of the second main tube. In some implementations, the tube coupler is engageable with the second surface of the first main tube and the second surface of the second main tube to couple the first main tube to the second main tube.

In some implementations, the plurality of main tube fastener openings of the first main tube is a plurality of first main tube fastener openings of the first main tube. In some implementations, the plurality of main tube fastener openings of the second main tube is a plurality of first main tube fastener openings of the second main tube. In some implementations, the second surface of the first main tube further defines a plurality of second main tube fastener openings spaced apart from each other in a direction parallel to the longitudinal axis of the first main tube. In some implementations, the second surface of the second main tube further defines a plurality of second main tube fastener openings spaced apart from each other in a direction parallel to the longitudinal axis of the second main tube. In some implementations, the tube coupler is engageable with at least one of the first main tube fastener openings of each of the first main tube and the second main tube and with at least one of the second main tube fastener openings of each of the first main tube and the second main tube.

In some implementations, the main tube includes metal.

BRIEF DESCRIPTION OF DRAWINGS

Example features and implementations of the present disclosure are disclosed in the accompanying drawings. However, the present disclosure is not limited to the precise arrangements and instrumentalities shown. Similar elements in different implementations are designated using the same reference numerals.

FIG. 3A is a perspective view of the first main tube component of FIG. 1.

FIG. 3B is a perspective view of the first main tube component coupled to the base mounting plate of FIG. 1.

FIG. 3C is an end view of the first main tube component coupled to the base mounting plate of FIG. 3B.

FIG. 5A is a perspective view of the step of FIG. 1.

FIG. 5B is a perspective view of the step coupled to a main tube, according to one implementation.

FIG. 6 is a perspective side view of a grip handle, according to one implementation.

DETAILED DESCRIPTION

Figure 1:
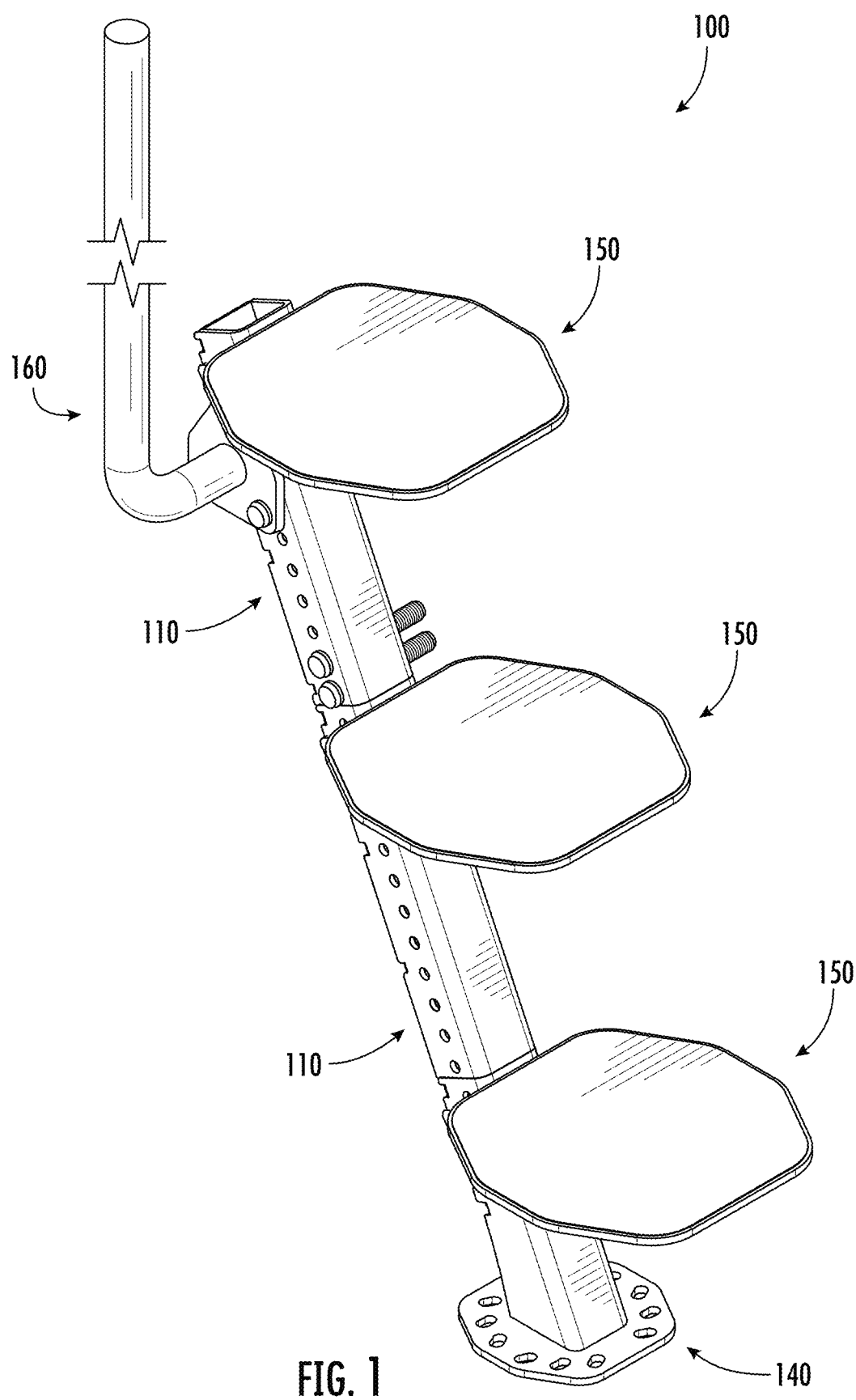
FIG. 1 is a perspective view of a modular step device for providing access to a vehicle, according to one implementation.

The present disclosure relates to a modular stepping device for providing access to vehicles, particularly boats or other elevated platforms. This device addresses the need for a versatile and adaptable access solution that can accommodate a wide range of vehicle heights and configurations. The modular nature of the device allows for customization to fit various applications, overcoming limitations of fixed-height or non-adjustable access systems.

The stepping device may incorporate features that enhance its durability, safety, and ease of use. In some cases, the device may undergo finishing processes such as paint application or powder coating to improve corrosion resistance and aesthetic appeal. These treatments may extend the lifespan of the device, particularly in marine environments where exposure to water and salt can be detrimental to untreated metals.

To further enhance safety and prevent slips, the steps of the device may be equipped with anti-slip grip tape. This feature may provide additional traction for users, especially in wet conditions often encountered around boats or other watercraft.

The device's mounting system may offer flexibility in installation angles. In some implementations, the base mounting plate may be configured to allow mounting at different angles relative to the vehicle or trailer. This adjustability may enable users to optimize the stepping angle for comfort and safety, adapting to various trailer designs or personal preferences.

For improved durability and paint adhesion, the device may undergo a media blasting process prior to finishing. This treatment may remove surface impurities and create a textured surface that enhances the bonding of paint or powder coat, potentially leading to a more durable and long-lasting finish.

By addressing these various aspects, the modular stepping device aims to provide a comprehensive solution to the challenges of vehicle access, offering adaptability, durability, and safety features that may not be present in conventional fixed stepping systems.

Various implementations include a device for providing access to a vehicle. The device includes a main tube having a longitudinal axis, a first end, and a second end spaced opposite and spaced apart along the longitudinal axis from the first end. A surface of the main tube between the first end and the second end defines a plurality of main tube fastener openings spaced apart from each other in a direction parallel to the longitudinal axis. The device also includes a base mounting plate coupled to the first end, with the base mounting plate defining one or more base mounting plate apertures extending therethrough. Additionally, the device includes at least a first step and a second step, each comprising a step platform and a step support gusset coupled to the step platform. The step support gusset of each of the first step and the second step defines one or more gusset fastener openings. The one or more gusset fastener openings of the first step and the second step are each alignable with a different one of the plurality of main tube fastener openings such that a fastener can extend through the one or more gusset fastener openings and the respective aligned main tube fastener opening to couple the first step and the second step to the main tube.

FIG. 1 shows a modular stepping device 100 for providing access to vehicles. The device 100 includes a first main tube 110, a second main tube 110, a base mounting plate 140, one or more steps 150, and a grip handle 160.

The main tube 110 serves as the primary structural component. The main tube 110 has a longitudinal axis 112, a first end 114, and a second end 116 spaced opposite and spaced apart along the longitudinal axis 112 from the first end 114. The main tube 110 is fabricated from metal, such as steel or aluminum, to provide strength and durability. In some implementations, the main tube 110 may be fabricated from stainless steel or other corrosion-resistant materials. The use of stainless steel or non-rusting materials may provide enhanced durability and longevity, particularly in marine environments or other applications where exposure to moisture is common.

As shown in FIG. 1 and FIGS. 2A-2C, the main tube 110 extends vertically when the device 100 is mounted to a vehicle. The main tube 110 has a length, as measured from the first end 114 to the second end 116, of 20 inches, allowing for various configurations to accommodate different vehicle heights.

Referring to FIGS. 3A-3C and FIGS. 4A-4C, the main tube 110 has two flat opposing sides 120. The main tube 110 has a rectangular cross-section. A surface of each side 120 of the main tube 110 between the first end 114 and the second end 116 defines a plurality of main tube fastener openings 136. These fastener openings 136 are spaced apart from each other in a direction parallel to the longitudinal axis 112 of the main tube 110.

The spacing between adjacent main tube fastener openings 136 is 1 inch. This spacing allows for flexible positioning of attachments, such as steps 150, along the length of the main tube 110. The main tube 110 includes a second surface 124, opposite the first surface 122, which also defines a plurality of main tube fastener openings 136 aligned with the plurality of main tube fastener openings 136 of the first surface 122. This configuration allows for a single fastener to be extended through a main tube fastener opening 136 on each side of the main tube 110 when coupling a component to the main tube 110, as discussed below.

The main tube 110 can be manufactured using a fiber laser and press brake to create a channel-like structure. To enhance rigidity, a full-length plate can be welded into the back of the main tube 110 channel, as shown in FIGS. 1-2C, 4B, 4C, and 5B. This reinforcement improves the overall strength and stability of the device 100.

The main tube 110, with its multiple fastener openings 136 and robust construction, provides a versatile foundation for attaching various components of the device 100, such as steps 150 and handles 160, allowing for customizable configurations to suit different vehicle types and user needs. In some implementations, the main tube 110 length can range from 15 inches to 25 inches. In some implementations, the main tube 110 can have a square or octagonal cross-section.

The first end 114 of the main tube 110 is welded, or otherwise coupled, to a base mounting plate 140. In some implementations, the first end 114 of the main tube 110 is welded to a base mounting plate 140 at an angle of 25 degrees from vertical. This angled configuration creates a more comfortable and ergonomic stepping arrangement for users accessing the vehicle. As shown in FIG. 3B, the base mounting plate 140 has an octagonal shape. The base mounting plate 140 defines a plurality of base mounting plate apertures 142 extending therethrough. In some implementations, the base mounting plate 140 includes four base mounting plate apertures 142. In some implementations, such as the base mounting plate 140 in FIGS. 1-2C, 3B, 3C, 4B, 4C, 7, and 8, the base mounting plate 140 includes twelve base mounting plate apertures 142.

Referring to FIG. 3C, the base mounting plate apertures 142 are arranged in a circular pattern around the perimeter of the base mounting plate 140. The base mounting plate apertures 142 are configured as slotted openings. In some implementations, the slotted openings of the base mounting plate apertures 142 extend in a direction forming an oblique angle with a plane defining the surface of the main tube 110. This angled configuration of the slotted openings allows for adjustable mounting of the device 100 to accommodate various vehicle or trailer configurations.

Figure 7:
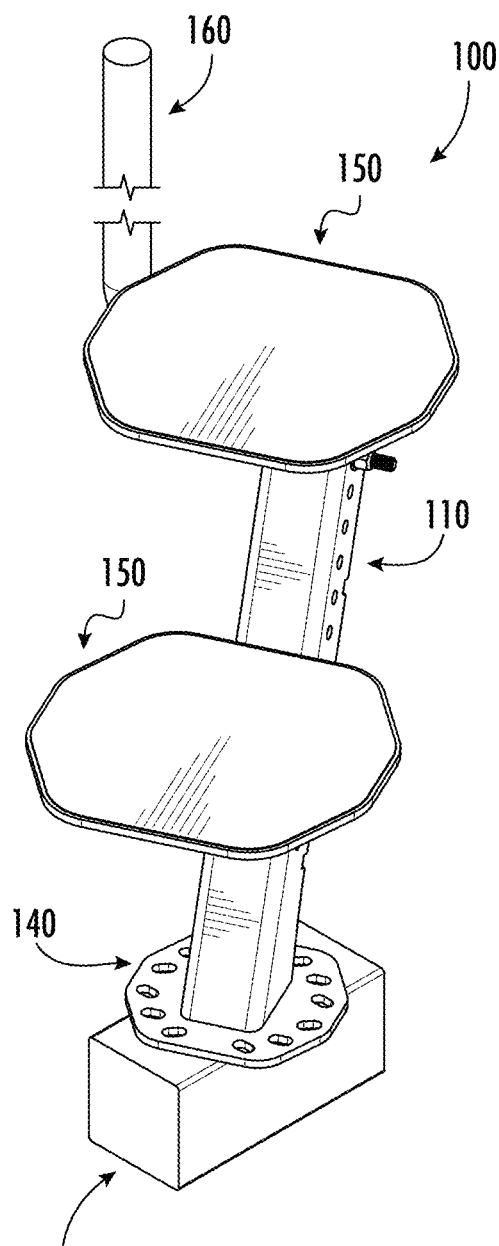
FIG. 7 is a perspective view of a modular step device coupled to a trailer frame or tongue, according to another implementation.

As illustrated in FIG. 7, the base mounting plate 140 is configured to mount to a vehicle, such as a trailer frame or tongue 190, using U-bolts. The U-bolts extend around the frame or tongue 190 of the trailer such that the ends of the U-bolts extend through the base mounting plate apertures 142. This mounting method provides a secure attachment of the device 100 to the vehicle.

The base mounting plate apertures 142 have a minimum spacing distance between closest edges of adjacent apertures. This minimum spacing distance ranges from 3 inches to 3.5 inches. This minimum spacing distance can be predetermined to accept the ends of a U-bolt that is correctly sized to fit around the frame or tongue 190 of a trailer. The spacing and configuration of the base mounting plate apertures 142 allow for flexibility in mounting the device 100 to various vehicle structures while maintaining structural integrity.

The base mounting plate 140 serves as the primary interface between the main tube 110 and the vehicle. By providing multiple mounting options through the various apertures 142, the base mounting plate 140 allows for secure and adjustable attachment of the device 100 to a wide range of vehicle types and configurations. As shown in FIG. 7, the multiple angles of the slotted base mounting plate apertures 142 allow the device 100 to be mounted at different angles relative to the trailer.

The device 100 includes at least one step 150. In some implementations, the device 100 includes at least a first step 150 and a second step 150. As shown in FIG. 1 and FIGS. 2A-2C, the steps 150 are arranged vertically along the main tube 110. Each step 150 comprises a step platform 152 and a step support gusset 154 coupled to the step platform 152.

Referring to FIG. 5A, the step platform 152 provides a flat surface for a user to stand on when accessing the vehicle. The step support gusset 154 is coupled to the bottom side of the step platform 152 and extends downward and outward at an angle. The step support gusset 154 provides structural support for the step platform 152 and serves as the attachment point to the main tube 110.

As illustrated in FIG. 5A, a first step support gusset 154 and a second step support gusset 154 are coupled to opposite sides of the step platform 152. This dual gusset configuration enhances the stability and load-bearing capacity of the step 150.

The step support gusset 154 of each step 150 defines two gusset fastener openings 156. These gusset fastener openings 156 are designed to align with the main tube fastener openings 136, allowing for secure attachment of the steps 150 to the main tube 110. In some implementations, the step support gussets 154 may include any number of gusset fastener openings 156. This flexibility in the number of gusset fastener openings 156 may allow for enhanced customization and adaptability of the step 150 attachment. In some implementations, each step 150 only includes one step support gusset 154.

As shown in FIG. 5B, the gusset fastener openings 156 of the step 150 are alignable with the main tube fastener openings 136. This alignment allows a fastener, such as a bolt, to extend through the gusset fastener openings 156 of each step support gusset 154 and the respective aligned main tube fastener opening 136, coupling the step 150 to the main tube 110. The multiple fastener openings on both the step support gusset 154 and the main tube 110 provide flexibility in positioning the steps 150 along the length of the main tube 110.

Figure 8:
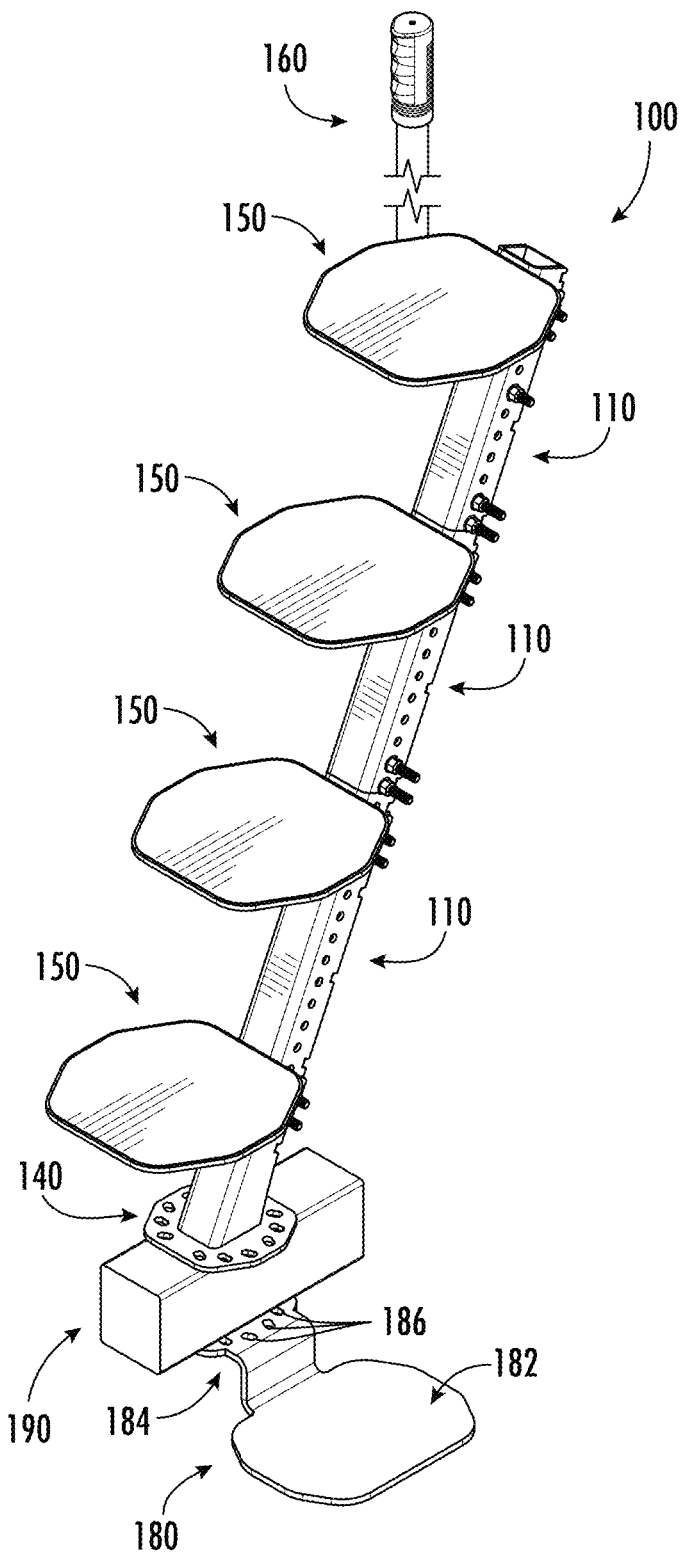
FIG. 8 is a perspective view of a modular step device with four steps and a nether step, according to another implementation.

As illustrated in FIG. 8, the device 100 includes a third step 150 and a fourth step 150. These additional steps 150 are coupled to the main tube 110 in the same manner as the first and second steps 150, using the alignment of gusset fastener openings 156 with main tube fastener openings 136.

The modular nature of the step 150 attachment system allows for customization of the number and spacing of steps 150 to suit various vehicle heights and user preferences. In some implementations, the multiple main tube fastener openings 136 along the length of the main tube 110 provide numerous options for step 150 placement, enabling users to configure the device 100 to meet specific access needs.

The device 100 includes a grip handle 160 that is coupled to the main tube 110. As shown in FIG. 1, the grip handle 160 is mounted to the main tube 110 near the second end 116. The grip handle 160 is configured for ambidextrous mounting, allowing attachment to either the left or right side of the main tube 110 to accommodate user preferences and vehicle configurations.

Referring to FIG. 6, the grip handle 160 comprises a grip handle mounting plate 162 and a handle member 164. The grip handle mounting plate 162 defines three grip handle mounting plate apertures 166 for coupling the grip handle 160 to the main tube 110. These apertures 166 align with corresponding main tube fastener openings 136, allowing for secure attachment of the grip handle 160 to the main tube 110 using fasteners such as bolts or screws.

The handle member 164 is coupled to the grip handle mounting plate 162. The handle member 164 can extend outward from the grip handle mounting plate 162 at an angle, providing a gripping surface for users accessing the vehicle. In some implementations, the handle member 164 is fabricated from a durable material such as metal or a high-strength polymer to withstand repeated use and environmental exposure.

The modular nature of the grip handle 160 attachment allows for flexible positioning along the length of the main tube 110. In some implementations, users adjust the height of the grip handle 160 to suit their needs by selecting different sets of main tube fastener openings 136 for attachment. This adaptability enhances the overall usability and ergonomics of the device 100 for a range of users and vehicle types.

Figure 4B:
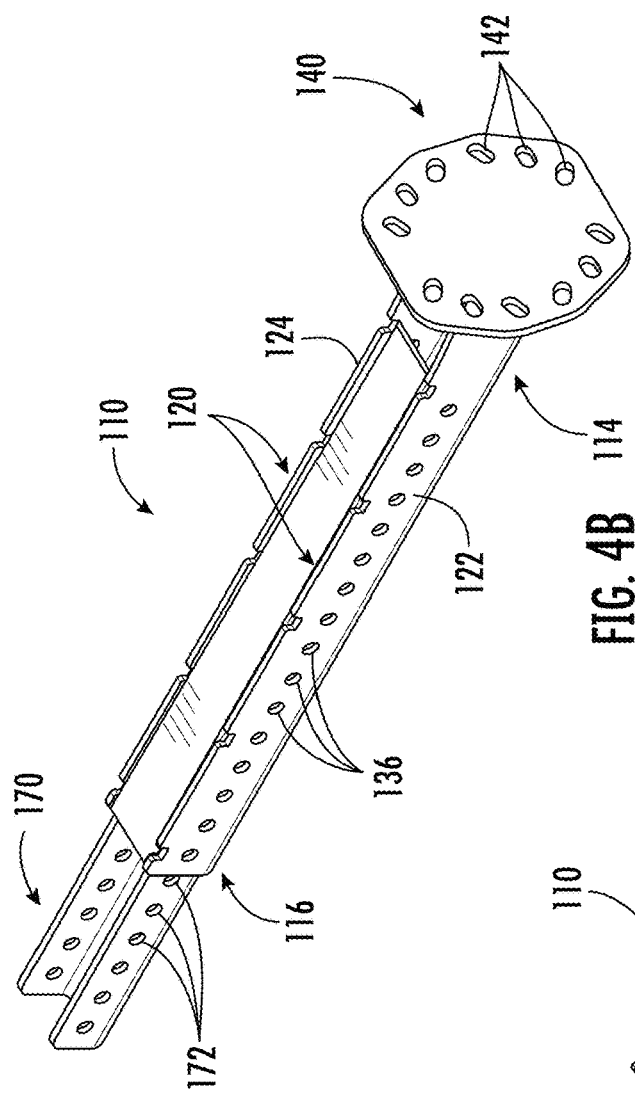
FIG. 4B is a perspective view of an assembled configuration of the first main tube component coupled to a tube coupler of FIG. 1.
Figure 4C:
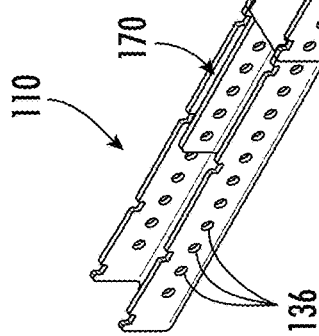
FIG. 4C is perspective view of an assembled configuration of the first and second main tubes with the tube coupler of FIG. 1.

A tube coupler 170 is used to connect multiple main tubes 110 to form a longer device 100. As shown in FIGS. 4B and 4C, the tube coupler 170 connects a first main tube 110 to a second main tube 110 to extend the device 100.

The tube coupler 170 has a U-shaped channel configuration that corresponds to the shape of the main tubes 110. This design allows the tube coupler 170 to fit inside the channels of both the first and second main tubes 110.

The tube coupler 170 engages both side of each main tube 110. This engagement provides a connection between the main tubes 110 and the tube coupler 170.

The tube coupler 170 defines a plurality of tube coupler fastener openings 172 along its length. These tube coupler fastener openings 172 align with the main tube fastener openings 136 of both the first and second main tubes 110 to couple the tube coupler 170 to the first and second main tubes 110.

To connect the main tubes 110, the tube coupler 170 is inserted into the channel of the first main tube 110, as illustrated in FIG. 4B. The tube coupler fastener openings 172 of the tube coupler 170 are aligned with the main tube fastener openings 136 of the first main tube 110. Fasteners, such as bolts or screws, are inserted through these aligned openings to secure the tube coupler 170 to the first main tube 110.

As shown in FIG. 4C, the second main tube 110 is coupled to the opposite end of the tube coupler 170 using the same method. The tube coupler fastener openings 172 of the tube coupler 170 are aligned with the main tube fastener openings 136 of the second main tube 110, and fasteners are used to secure the connection.

This modular coupling system allows for the extension of the device 100 to accommodate various height requirements. In some implementations, multiple tube couplers 170 and main tubes 110 are used to create a device 100 of increased height, providing access to vehicles or structures of varying elevations.

The engagement of the tube coupler 170 with the main tube fastener openings 136 provides a connection between the main tubes 110. This connection method distributes the load along the length of the coupled main tubes 110, enhancing the overall stability of the extended device 100.

The device 100 can include a nether step 180 that is couplable to the base mounting plate 140. As shown in FIG. 8, the nether step 180 includes a nether step platform 182 and a nether step mounting plate 184 coupled to the nether step platform 182. The nether step mounting plate 184 defines one or more nether step apertures 186 for coupling the nether step 180 to the base mounting plate 140.

As illustrated in FIG. 7, the base mounting plate 140 is mounted to the top side of a vehicle frame or tongue 190. The nether step 180 is positioned on the bottom side of the vehicle frame or tongue 190, with the nether step apertures 186 aligning with the base mounting plate apertures 142.

The nether step 180 is secured to the vehicle and the base mounting plate 140 using U-bolts. The U-bolts extend around the vehicle frame or tongue 190, passing through both the nether step apertures 186 and the base mounting plate apertures 142. This configuration creates a sandwich-like attachment, with the vehicle frame or tongue 190 secured between the nether step 180 and the base mounting plate 140.

The nether step platform 182 provides an additional stepping surface for users accessing the vehicle. The nether step platform 182 is positioned lower than the other steps 150 of the device 100, offering a first point of contact for users beginning their ascent to the vehicle.

The modular nature of the nether step 180 attachment allows for flexible positioning and use based on specific vehicle configurations and user needs. In some implementations, the nether step 180 is optional, with users choosing to install or omit the nether step 180 based on their particular access requirements.

The modular stepping device 100 is assembled to provide customizable access to a vehicle. As illustrated in FIG. 1, the device 100 includes multiple components that are combined in various configurations to suit different vehicle heights and user needs.

The assembly process begins with the attachment of the base mounting plate 140 to top surface of a trailer frame or tongue 190. U-bolts are used to secure the base mounting plate 140 to the trailer frame or tongue 190, providing a stable foundation for the rest of the device 100. If a nether step 180 is included, then the nether step mounting plate 184 is positioned along a bottom surface of the trailer frame or tongue 190 and the U-bolts are used to secure the base mounting plate 140 and the nether step 180 to the trailer frame or tongue 190.

Figure 2C:
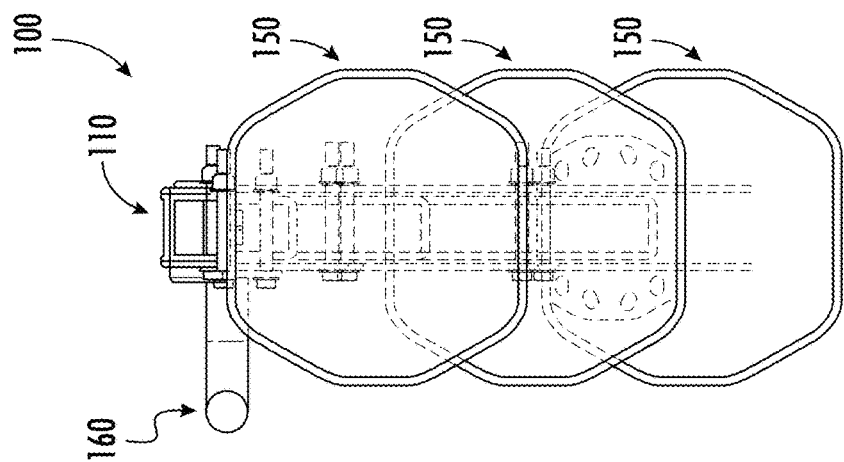
FIG. 2C is a top view of the modular step device of FIG. 1.
Figure 2B:
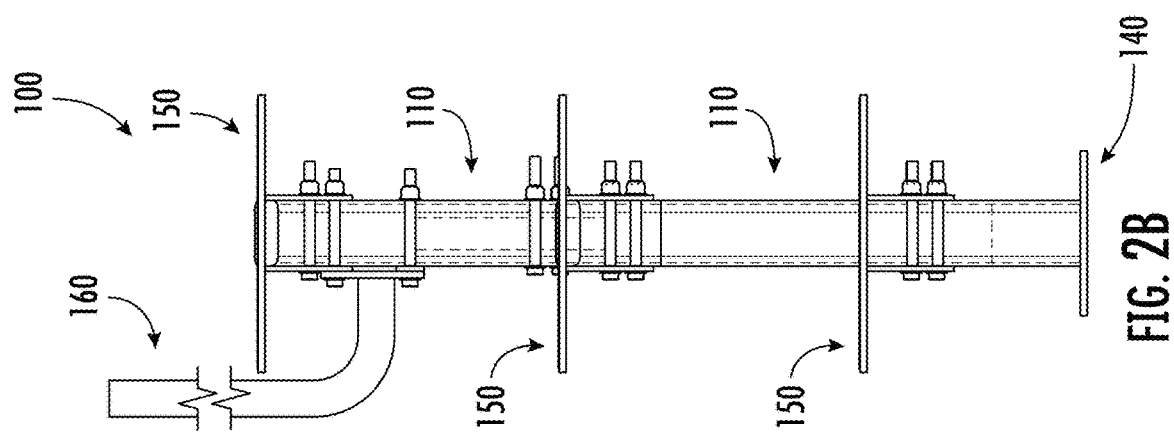
FIG. 2B is a front view of the modular step device of FIG. 1.
Figure 2A:
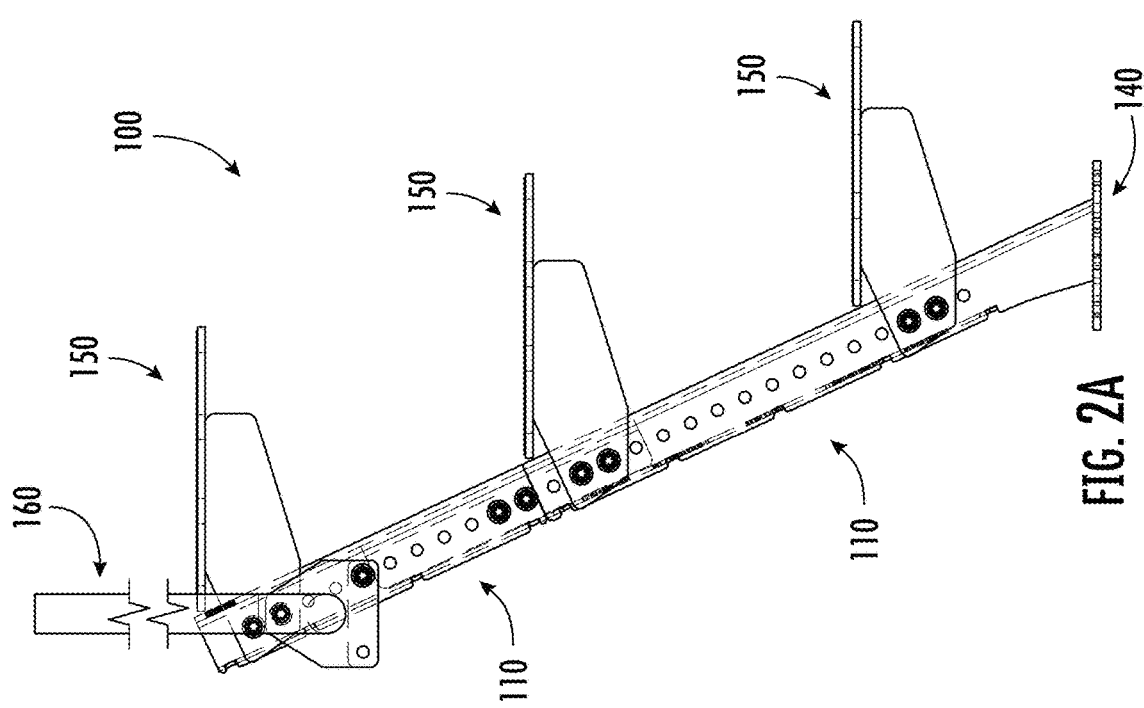
FIG. 2A is a side view of the modular step device of FIG. 1.

If the main tube 110 is separately formed from the base mounting plate 140, then the main tube 110 is then coupled to the base mounting plate 140. As shown in FIGS. 2A, 2B, and 2C, the main tube 110 extends vertically from the base mounting plate 140 when the device 100 is mounted. The angled orientation of the main tube 110 relative to the base mounting plate 140 creates a stepping arrangement for users.

Steps 150 are attached to the main tube 110 using the fastener openings 136 along its length. The modular nature of the step 150 attachment system allows for flexible positioning of the steps 150. In some implementations, users adjust the number and spacing of steps 150 to accommodate specific vehicle heights or personal preferences.

Figure 4A:
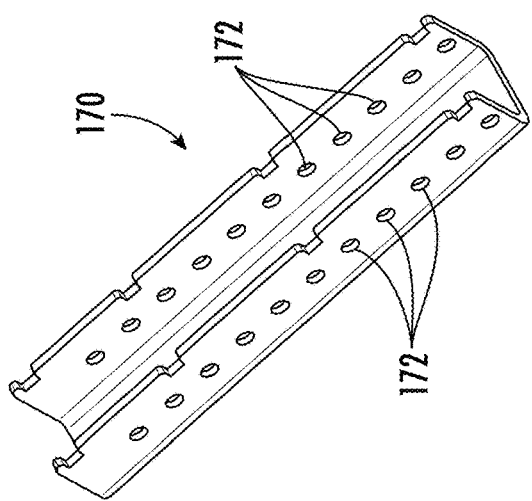
FIG. 4A is a perspective view of the second main tube component of FIG. 1.

For situations requiring additional height, the device 100 is extended using a tube coupler 170 and a second main tube 110, as depicted in FIGS. 4A-4C. The tube coupler 170 is inserted into the channel of the first main tube 110 and secured using fasteners. The second main tube 110 is then attached to the opposite end of the tube coupler 170 in a similar manner, increasing the overall height of the device 100.

A grip handle 160 is mounted near the upper end of the main tube 110 to provide additional support for users accessing the vehicle. In some implementations, the position of the grip handle 160 is adjusted along the length of the main tube 110 to suit different user heights or vehicle configurations. In some implementations, two or more grip handles 160 can be mounted along the main tube 110 to provide multiple points of support for users.

The assembled device 100 functions by providing a series of steps 150 and a support handle 160 for users to climb when accessing a vehicle. The modular design allows for customization to fit various vehicle types and heights. Users ascend the device 100 by stepping on each platform 152 in sequence, using the grip handle 160 for balance and support as needed.

The adaptability of the device 100 is demonstrated through its ability to accommodate different vehicle configurations. For example, the spacing between steps 150 is adjusted to create a climbing experience for users of varying heights. Additionally, the overall height of the device 100 is modified by adding or removing main tube 110 sections as required for specific vehicles.

In some implementations, the device 100 is reconfigured or adjusted without complete disassembly, allowing for modifications to suit changing needs or different vehicles. This flexibility enhances the utility of the device 100 across a range of applications, from providing access to boats on trailers to facilitating entry into other elevated vehicles or platforms.

A number of example implementations are provided herein. However, it is understood that various modifications can be made without departing from the spirit and scope of the disclosure herein. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. Although the terms "comprising" and "including" have been used herein to describe various implementations, the terms "consisting essentially of" and "consisting of" can be used in place of "comprising" and "including" to provide for more specific implementations and are also disclosed.

Disclosed are materials, systems, devices, methods, compositions, and components that can be used for, can be used in conjunction with, can be used in preparation for, or are products of the disclosed methods, systems, and devices. These and other components are disclosed herein, and it is understood that when combinations, subsets, interactions, groups, etc. of these components are disclosed that while specific reference of each various individual and collective combinations and permutations of these components may not be explicitly disclosed, each is specifically contemplated and described herein. For example, if a device is disclosed and discussed each and every combination and permutation of the device are disclosed herein, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed systems or devices. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

What is claimed is:

1. A device for providing access to a vehicle, the device comprising:
   a main tube having a longitudinal axis, a first end, and a second end spaced opposite and spaced apart along the longitudinal axis from the first end, wherein a surface of the main tube between the first end and the second end defines a plurality of main tube fastener openings spaced apart from each other in a direction parallel to the longitudinal axis;
   a base mounting plate coupled to the first end, the base mounting plate defining one or more base mounting plate apertures extending therethrough; and
   at least a first step and a second step each comprising a step platform and a step support gusset coupled to the step platform, wherein the step support gusset of each of the first step and the second step defines one or more gusset fastener openings,
   wherein the one or more gusset fastener openings of the first step and the second step are each alignable with a different one of the plurality of main tube fastener openings such that a fastener can extend through the one or more gusset fastener openings and the respective aligned main tube fastener opening to couple the first step and the second step to the main tube.

2. The device of claim 1, wherein the one or more gusset fastener openings of the first step and the second step include two or more gusset fastener openings.

3. The device of claim 1, further comprising a grip handle that is couplable to the main tube.

4. The device of claim 3, wherein the grip handle further comprises:
   a grip handle mounting plate defining one or more grip handle mounting plate apertures for coupling the grip handle to the main tube; and
   a handle member coupled to the grip handle mounting plate.

5. The device of claim 1, wherein the spacing between each adjacent of the plurality of main tube fastener openings ranges from 0.5 inches to 1.5 inches.

6. The device of claim 1, wherein the main tube has a length as measured from the first end to the second end, wherein the length ranges from 15 inches to 25 inches.

7. The device of claim 1, wherein the surface of the main tube is a first surface, wherein the main tube further includes a second surface between the first end and the second end, wherein the first surface is spaced apart from the second surface, wherein the plurality of main tube fastener openings is a plurality of first main tube fastener openings, wherein the second surface defines a plurality of second main tube fastener openings spaced apart from each other in a direction parallel to the longitudinal axis.

8. The device of claim 7, wherein the step support gusset of the first step and the second step is a first step support gusset and the one or more gusset fastener openings of the first step and the second step are one or more first gusset fastener openings, wherein each of the first step and the second step further include a second step support gusset coupled to the step platform, wherein the second step support gusset of each of the first step and the second step defines one or more second gusset fastener openings, wherein the one or more second gusset fastener openings of the first step and the second step are each alignable with a different one of the plurality of second main tube fastener openings such that a fastener can extend through the one or more second gusset fastener openings and the respective aligned second main tube fastener opening to couple the first step and the second step to the main tube.

9. The device of claim 1, wherein the one or more base mounting plate apertures comprise four or more base mounting plate apertures.

10. The device of claim 1, wherein the one or more base mounting plate apertures comprise slotted openings.

11. The device of claim 10, wherein the slotted openings of the one or more base mounting plate apertures extend in a direction forming an oblique angle with a plane defining the surface of the main tube.

12. The device of claim 1, wherein the one or more base mounting plate apertures comprise two or more base mounting plate apertures, wherein the two or more base apertures have a minimum spacing distance as measured between closest edges of the two or more base mounting plate apertures, wherein the minimum spacing distance is in the range from 3 inches to 3.5 inches.

13. The device of claim 1, further comprising:
   a nether step that is couplable to the base mounting plate, the nether step further comprising:
      a nether step platform, and
      a nether step mounting plate coupled to the nether step platform,
      wherein the nether step mounting plate includes one or more nether step apertures for coupling the nether step to the base mounting plate.

14. The device of claim 1, further comprising:
   a third step comprising a step platform and a step support gusset coupled to the step platform of the third step, wherein the step support gusset of the third step defines one or more third gusset fastener openings,
   wherein the one or more third gusset fastener openings are each alignable with a different one of the plurality of main tube fastener openings such that a fastener can extend through the one or more third gusset fastener openings and the respective aligned main tube fastener opening to couple the third step to the main tube.

15. The device of claim 14, further comprising:
   a fourth step comprising a step platform and a step support gusset coupled to the step platform of the fourth step, wherein the step support gusset of the fourth step defines one or more fourth gusset fastener openings,
   wherein the one or more fourth gusset fastener openings are each alignable with a different one of the plurality of main tube fastener openings such that a fastener can extend through the one or more fourth gusset fastener openings and the respective aligned main tube fastener opening to couple the fourth step to the main tube.

16. The device of claim 1, wherein the main tube is a first main tube, the device further comprising a second main tube and a tube coupler, wherein the second main tube has a longitudinal axis, a first end, and a second end spaced opposite and spaced apart along the longitudinal axis of the second main tube from the first end of the second main tube, wherein a surface of the second main tube between the first end of the second main tube and the second end of the second main tube defines a plurality of main tube fastener openings spaced apart from each other in a direction parallel to the longitudinal axis of the second main tube, wherein the tube coupler is engageable with the surface of the first main tube and the surface of the second main tube to couple the first main tube to the second main tube.

17. The device of claim 16, wherein the tube coupler is engageable with at least one of the main tube fastener openings of each of the first main tube and the second main tube.

18. The device of claim 16, wherein the surface of the first main tube is a first surface, wherein the first main tube further includes a second surface between the first end of the first main tube and the second end of the first main tube, wherein the first surface of the first main tube is spaced apart from the second surface of the first main tube, wherein the surface of the second main tube is a first surface, wherein the second main tube further includes a second surface between the first end of the second main tube and the second end of the second main tube, wherein the first surface of the second main tube is spaced apart from the second surface of the second main tube, wherein the tube coupler is engageable with the second surface of the first main tube and the second surface of the second main tube to couple the first main tube to the second main tube.

19. The device of claim 18, wherein the plurality of main tube fastener openings of the first main tube is a plurality of first main tube fastener openings of the first main tube, wherein the plurality of main tube fastener openings of the second main tube is a plurality of first main tube fastener openings of the second main tube, wherein the second surface of the first main tube further defines a plurality of second main tube fastener openings spaced apart from each other in a direction parallel to the longitudinal axis of the first main tube, wherein the second surface of the second main tube further defines a plurality of second main tube fastener openings spaced apart from each other in a direction parallel to the longitudinal axis of the second main tube, wherein the tube coupler is engageable with at least one of the first main tube fastener openings of each of the first main tube and the second main tube and with at least one of the second main tube fastener openings of each of the first main tube and the second main tube.

20. The device of claim 1, wherein the main tube comprises metal.

\* \* \* \* \*